(12) United States Patent
Chen

(10) Patent No.: US 12,441,136 B2
(45) Date of Patent: Oct. 14, 2025

(54) LUGGAGE CASTER FOR MAINTENANCE AND REPLACEMENT AND VERTICAL SHAFT THEREOF

(71) Applicant: Lianying Yu, Shanghai (CN)

(72) Inventor: Jiandao Chen, Wenzhou (CN)

(73) Assignee: Lianying Yu, Shanghai (CN)

( * ) Notice: Subject to any disclaimer, the term of this patent is extended or adjusted under 35 U.S.C. 154(b) by 0 days.

(21) Appl. No.: 18/751,374

(22) Filed: Jun. 24, 2024

(65) Prior Publication Data
US 2025/0196534 A1 Jun. 19, 2025

(30) Foreign Application Priority Data
Dec. 18, 2023 (CN) .......................... 202323448821.5

(51) Int. Cl.
*B60B 33/00* (2006.01)
*A45C 5/14* (2006.01)

(52) U.S. Cl.
CPC .......... *B60B 33/0068* (2013.01); *A45C 5/143* (2013.01); *B60B 33/0002* (2013.01); *B60B 33/0028* (2013.01); *B60B 33/0042* (2013.01); *B60B 33/0049* (2013.01); *B60B 33/0057* (2013.01); *B60B 33/0073* (2013.01); *B60B 2200/45* (2013.01); *B60B 2310/311* (2013.01); *B60B 2900/113* (2013.01); *B60B 2900/541* (2013.01)

(58) Field of Classification Search
CPC ............ B60B 33/0068; B60B 33/0021; B60B 33/0002; B60B 33/0005; B60B 33/0007; B60B 33/0028; A45C 5/143

USPC ............................................................ 16/30
See application file for complete search history.

(56) References Cited

U.S. PATENT DOCUMENTS

| | | | | | |
|---|---|---|---|---|---|
| 46,334 | A | * | 2/1865 | Beardsley | B60B 33/0002 16/43 |
| 47,007 | A | * | 3/1865 | Ford | B60B 33/0002 12/139 |
| 2,976,562 | A | * | 3/1961 | Black | B60B 33/0002 16/21 |
| 3,142,085 | A | * | 7/1964 | Black | B60B 33/0002 16/21 |
| 4,321,727 | A | * | 3/1982 | Sheiman | A45C 5/14 16/45 |

(Continued)

FOREIGN PATENT DOCUMENTS

| CN | 213464071 U * 6/2021 | |
|---|---|---|
| EP | 2946943 A1 * 11/2015 | B60B 33/0002 |

*Primary Examiner* — Jeffrey O'Brien
(74) *Attorney, Agent, or Firm* — WPAT, PC

(57) ABSTRACT

A luggage caster for maintenance and replacement includes a wheel frame, a vertical shaft, and trolley wheels in a clearance fit with the wheel frame. The vertical shaft is configured to rotate axially within a vertical shaft hole of the wheel frame. a bottom end of the vertical shaft defines a riveting hole for forming a riveting flange. A top end of the vertical shaft is provided with a limiting plate that cooperates with the riveting flange to achieve an axial limitation of the vertical shaft in the vertical shaft hole. The top end of the vertical shaft is further provided with an installation head that protrudes from the limiting plate. The installation head is configured to insert into a shaft hole of a luggage bottom support. The riveting hole of the vertical shaft extends axially along the vertical shaft to define an anti-rotation tool hole.

8 Claims, 4 Drawing Sheets

(56) References Cited

U.S. PATENT DOCUMENTS

| | | | | |
|---|---|---|---|---|
| 4,805,260 | A * | 2/1989 | Tooth | F16B 7/025 411/908 |
| 6,115,882 | A * | 9/2000 | Miles | B60B 33/0002 16/37 |
| 6,530,119 | B2 * | 3/2003 | Yeh | B60B 33/0002 16/21 |
| 6,877,185 | B2 * | 4/2005 | Reilly | B60B 33/0028 16/21 |
| 8,904,598 | B2 * | 12/2014 | Waitz | B60B 33/0026 16/35 R |
| 9,764,593 | B2 * | 9/2017 | Kaplan | B60B 33/0018 |
| 9,908,366 | B2 * | 3/2018 | Bruno | B60B 33/00 |
| 2014/0250628 | A1 * | 9/2014 | Tsai | B60B 33/0007 16/47 |
| 2015/0360512 | A1 * | 12/2015 | Tsai | B60B 33/0018 16/38 |
| 2019/0160867 | A1 * | 5/2019 | Wang | B60B 33/0028 |

* cited by examiner

LUGGAGE CASTER FOR MAINTENANCE AND REPLACEMENT AND VERTICAL SHAFT THEREOF

TECHNICAL FIELD

The present disclosure relates to luggage accessories, in particular to a caster used to support luggage movement.

BACKGROUND

A luggage case is a movable storage container that relies on rolling of casters to move. Existing luggage cases generally adopt a universal wheel design, and casters are vulnerable components of luggage cases. In order to extend the service life of luggage cases, current technological improvements are committed to designing detachable and replaceable luggage casters.

However, in order to reduce factory costs of luggage cases and avoid technical limitations, there are still a large number of luggage cases provided with non-removable casters. A structure of non-removable caster adopted is as follows: a head end of a wheel shaft passes through a shaft hole of a luggage bottom support, and an end is riveted to the limit of the wheel axle on the luggage bottom support. The above-mentioned casters have a simple structure, mature technology, and low processing costs. However, for this type of luggage cases, after the casters are damaged, users cannot find a replacement caster, so that the luggage cases can only be discarded after the casters are damaged, resulting in waste.

SUMMARY

A purpose of the present disclosure is to overcome the shortcomings of the related art, and thus the present disclosure provides a versatile and convenient luggage caster for maintenance and replacement.

To achieve the above purpose, the present disclosure provides the following technical solution:

a luggage caster for maintenance and replacement, including: a wheel frame, a vertical shaft, and trolley wheels in a clearance fit with the wheel frame; wherein the vertical shaft is configured to rotate axially within a vertical shaft hole of the wheel frame; a bottom end of the vertical shaft defines a riveting hole, and the bottom end of the vertical shaft is provided with a riveting flange surrounding the riveting hole; a top end of the vertical shaft is provided with a limiting plate that cooperates with the riveting flange to achieve an axial limitation of the vertical shaft in the vertical shaft hole; the top end of the vertical shaft is further provided with an installation head that protrudes from the limiting plate; the installation head is configured to insert into a shaft hole of a luggage bottom support; the riveting hole of the vertical shaft extends axially along the vertical shaft to define an anti-rotation tool hole, and the anti-rotation tool hole is configured to cooperate with the vertical shaft to achieve linkage locking along a circumferential direction of the vertical shaft after a tool is inserted into the anti-rotation tool hole; the installation head of the vertical shaft is provided with a threaded structure, and the threaded structure is threaded with a limiting fastener; and the limiting fastener is configured to match with the luggage bottom support axially, thereby limiting the installation head in the shaft hole of the luggage bottom support.

When the luggage caster of the present disclosure is used for maintenance and replacement, for a traditional riveting caster, an original riveting head can be removed directly by using drilling equipment (such as an electric hand drill), so that the original caster can be disassembled. Then, the installation head of the vertical shaft is inserted into a shaft hole of the luggage case, a tool is inserted into the anti-rotation tool hole at the bottom of the vertical shaft, and the tool can limit the rotation of the vertical shaft. Since the tool can limit the rotation of the vertical shaft, the limiting fastener is conveniently screwed with the threaded structure of the installation head, and the caster is installed on the luggage bottom support. The vertical shaft of the caster is integrated on the wheel frame through the riveting flange and the limiting plate, thereby forming an integral accessory. The use of the luggage caster of the preset disclosure is convenient, and the luggage caster has good universality. After the original caster is disassembled, a common tool can be used for direct installation of the luggage caster. The luggage caster has the advantages of simple and convenient replacement installation operation. The riveting hole is directly extended to define the anti-rotation tool hole, which realizes the positioning and fixation of the vertical shaft. The luggage caster has the advantages of simple structure and convenient processing.

In an embodiment, the anti-rotation tool hole is an inner hexagonal hole. Under this structural design, a regular internal hexagonal wrench can be used for the anti-rotation tool hole.

In an embodiment, the installation head includes: a cylindrical body; the threaded structure is an internal threaded hole defined in the cylindrical body; the limiting fastener includes a fastening bolt and a gasket; and the fastening bolt is threaded in the internal threaded hole. Under this structural design, the installation head adopts an internal threaded hole design. The internal threaded hole design effectively utilizes an axial length space of the vertical shaft, ensures that the fastening bolt is securely locked while achieving a compact structure after locking, and a top of the vertical shaft does not protrude too high.

In an embodiment, the wheel frame is provided wheel body installation hubs on two sides of the wheel frame; each of the wheel body installation hubs is hollow and cylindrical in shape; and central cylinder cavities of the wheel body installation hubs are connected to each other; the wheel body installation hubs are provided with bearings, and the trolley wheels are installed on the bearings respectively; an end of each of the wheel body installation hubs is covered with a limiting wheel cover; the limiting wheel cover includes a limiting cover ring; a center of the limiting cover ring extends axially to form an installation sleeve; an outer circumference of the installation sleeve is provided with a clamp part; and a wall of each of the central cylinder cavities is provided with a clamp head snap-fitted with the clamp part; the installation sleeve is configured to insert into a corresponding one of the central cylinder cavities, and the installation sleeve is configured to fix on a corresponding one of the wheel body installation hubs through the clamp part and the clamp head; and the limiting cover ring is in a limiting fit with the a corresponding one of the bearings in an axial direction. Under this structural design, the luggage caster is hollow with a novel structure, and the bearing is axially limited to the wheel body installation hub by the limiting cover ring and the snap fit between the clamp part and the clamp head, which has the advantages of simple structure, convenient installation, and stable structure.

In an embodiment, an axial edge of each of the trolley wheels is provided with a wheel rim, and the wheel rim is configured to cover an outer circumferential side wall of the limiting cover ring; and the wheel rim is in a clearance fit with the outer circumferential side wall of the limiting cover ring. Under this structural design, the sealing protection of bearings is improved.

The following is a further description of the present disclosure in conjunction with drawings.

BRIEF DESCRIPTION OF DRA WINGS

DETAILED DESCRIPTION OF EMBODIMENTS

Figure 1:
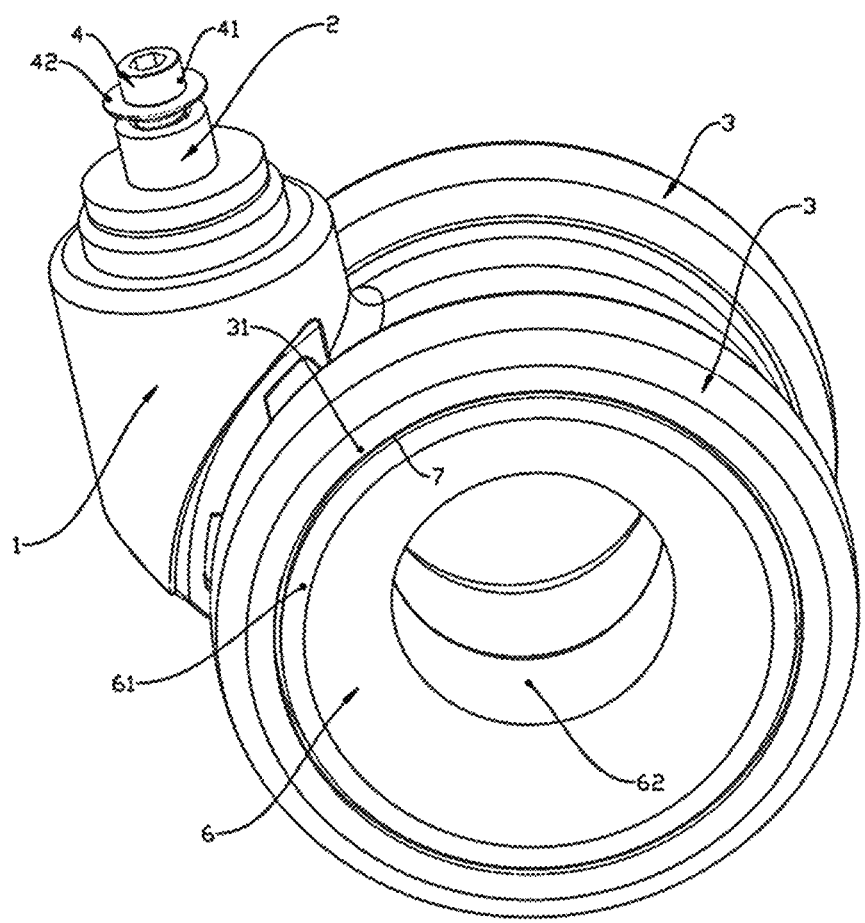
FIG. 1 illustrates a three-dimensional view of a luggage caster for maintenance and replacement in the present disclosure.
Figure 2:
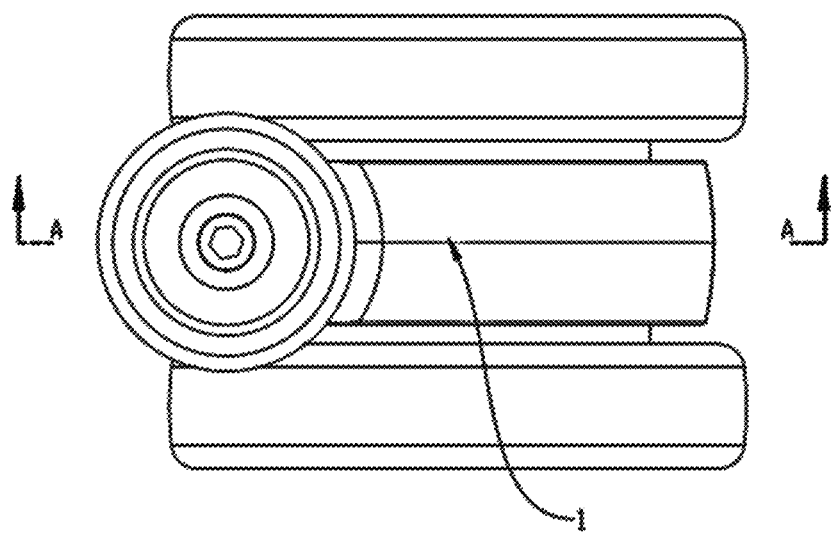
FIG. 2 illustrates a top view of the luggage caster for maintenance and replacement in the present disclosure.
Figure 3:
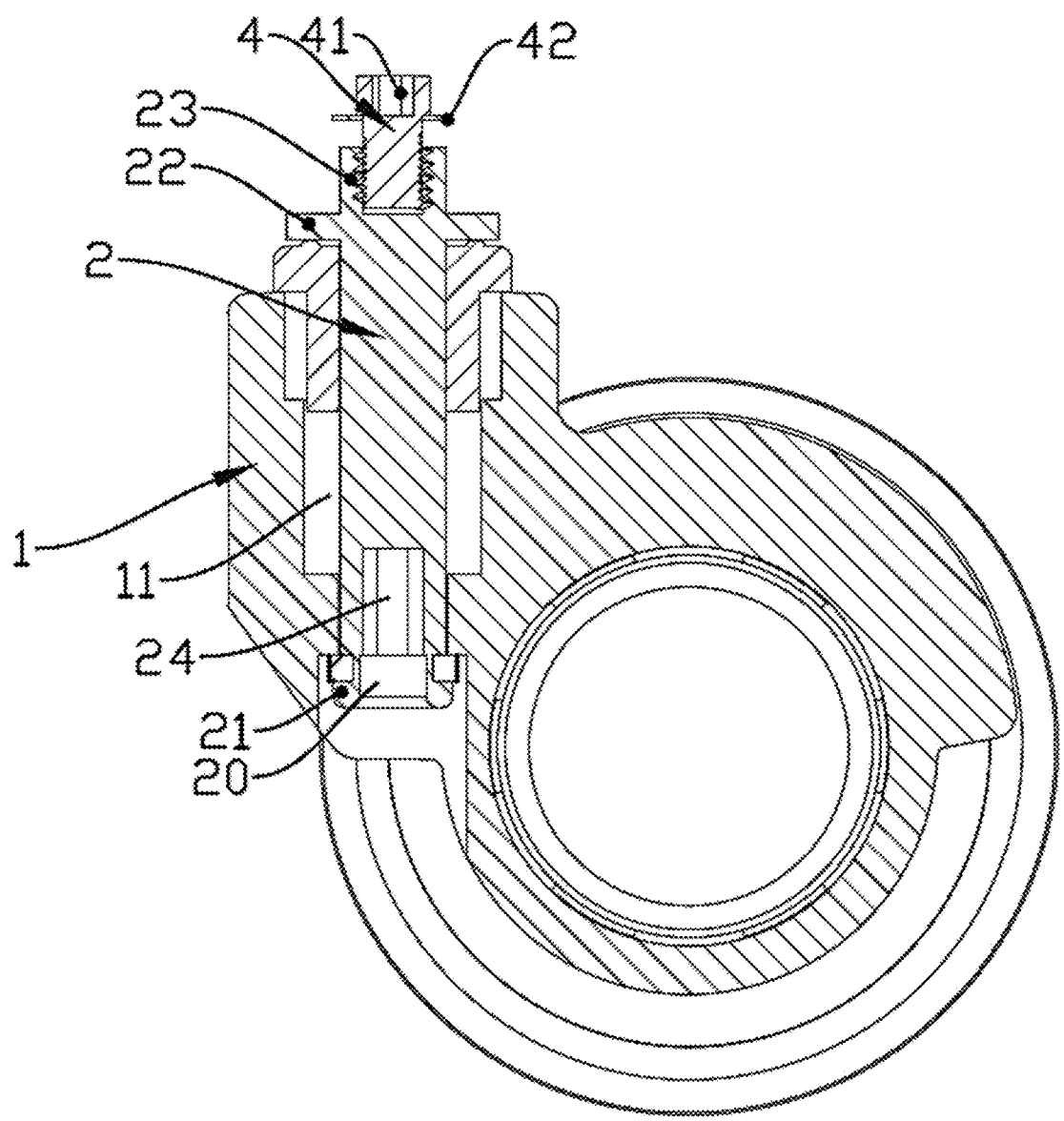
FIG. 3 illustrates a sectional view of the luggage caster for maintenance and replacement cut along the A-A line in FIG. 2.
Figure 4:
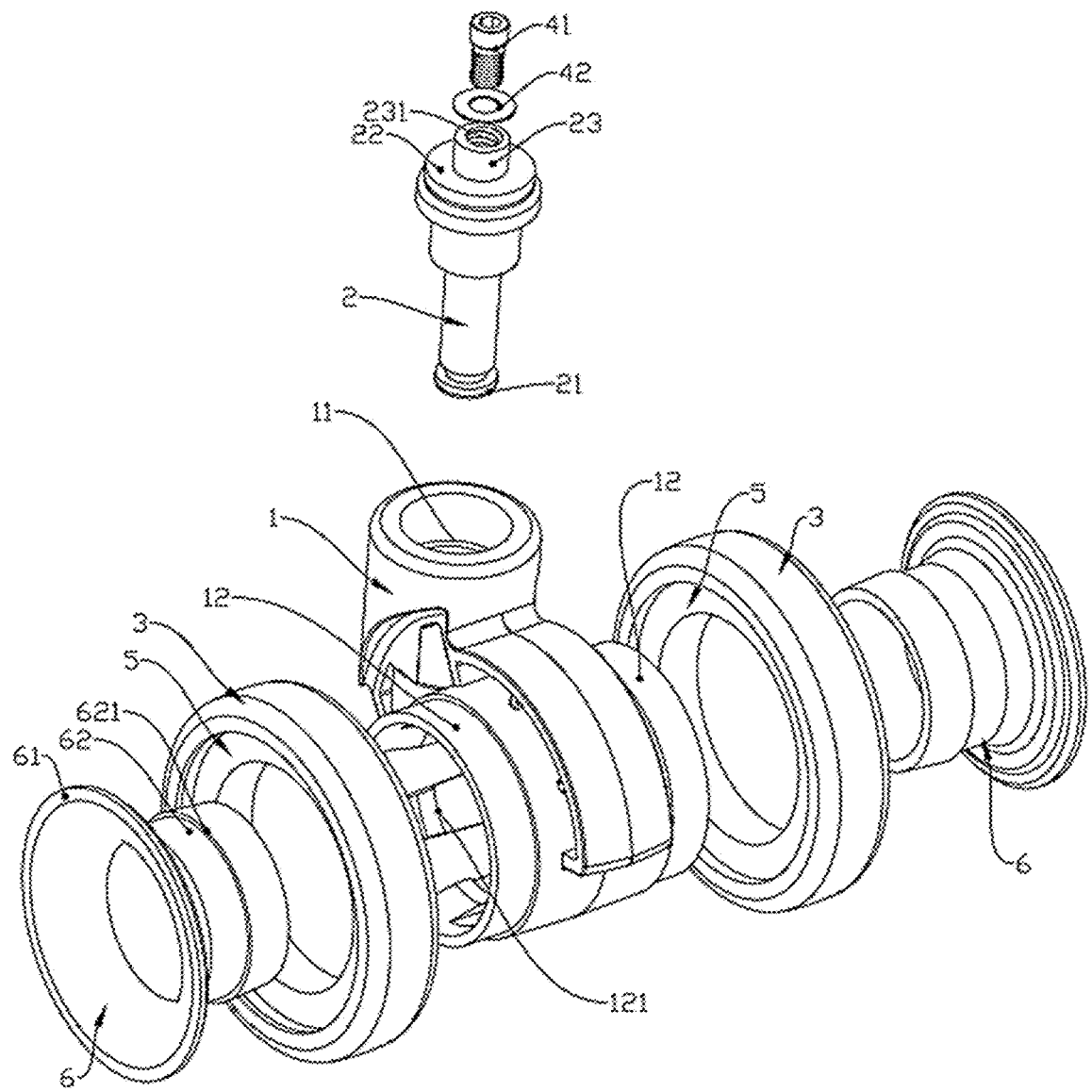
FIG. 4 illustrates an exploded view of the luggage caster for maintenance and replacement in the present disclosure.
Figure 5:
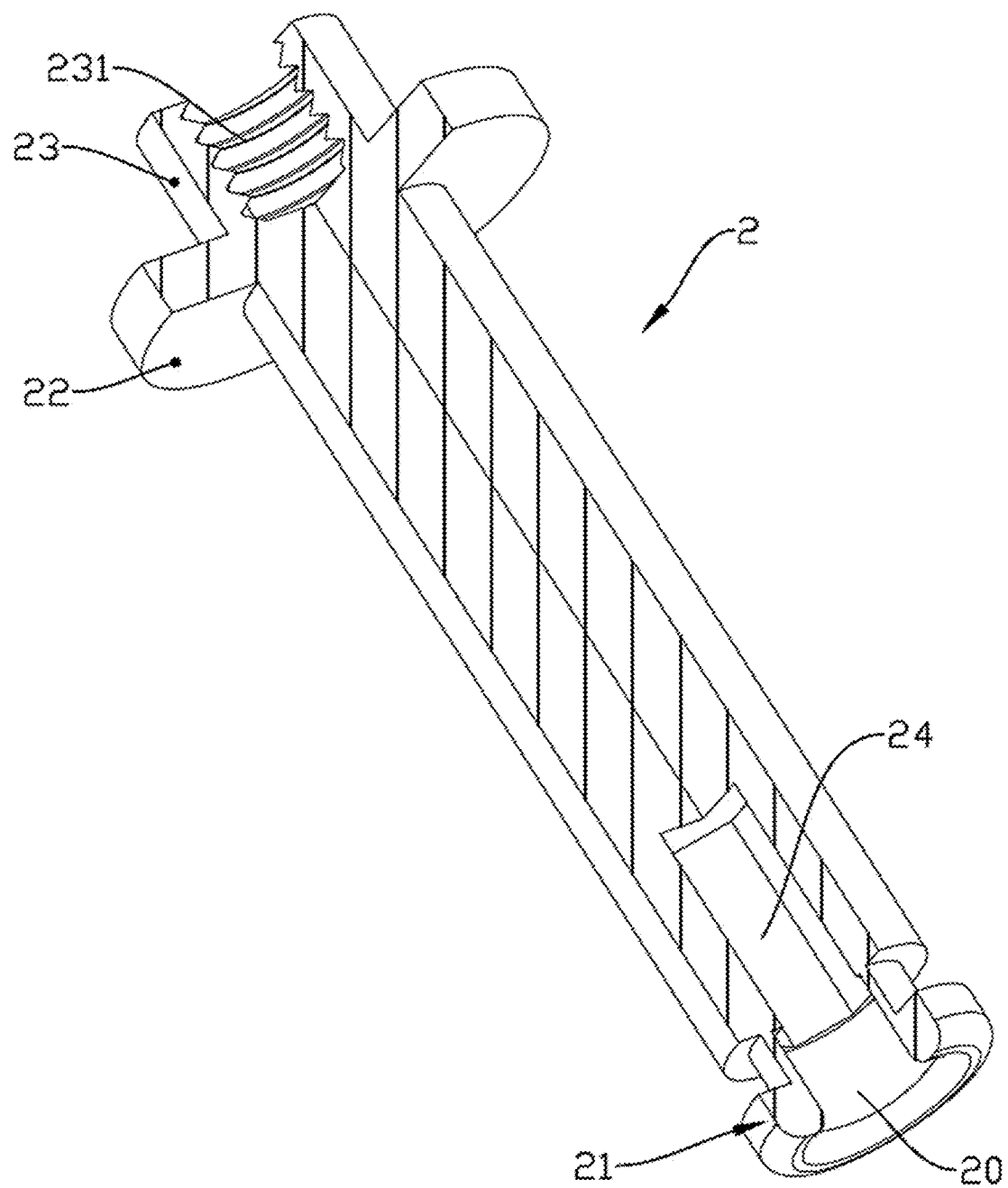
FIG. 5 illustrates a structural view of a vertical shaft in the present disclosure.

Referring to FIGS. 1 to 5, the present disclosure discloses a luggage caster for maintenance and replacement. The luggage caster includes a wheel frame 1, a vertical shaft 2, and trolley wheels 3 in a clearance fit with the wheel frame 1. The vertical shaft 2 is configured to rotate axially within a vertical shaft hole 11 of the wheel frame 1. A bottom end of the vertical shaft 2 defines a riveting hole 20, and the bottom end of the vertical shaft 2 is provided with a riveting flange 21 surrounding the riveting hole 20. A top end of the vertical shaft 2 is provided with a limiting plate 22 that cooperates with the riveting flange 21 to achieve an axial limitation of the vertical shaft 2 in the vertical shaft hole 11. When the caster is designed to be buffered and shock-absorbing, the vertical shaft 2 has axial movement for buffering. The top end of the vertical shaft 2 is further provided with an installation head 23 that protrudes from the limiting plate 22. The installation head 23 is configured to insert into a shaft hole of a luggage bottom support. The riveting hole 20 of the vertical shaft 2 extends axially along the vertical shaft 2 to define an anti-rotation tool hole, 24 and the anti-rotation tool hole 24 is configured to cooperate with the vertical shaft 2 to achieve linkage locking along a circumferential direction of the vertical shaft 2 after a tool is inserted into the anti-rotation tool hole 24. The installation head 23 of the vertical shaft 2 is provided with a threaded structure 231, and the threaded structure 231 is threaded with a limiting fastener 4. The limiting fastener 4 is configured to match with the luggage bottom support axially, thereby limiting the installation head 23 in the shaft hole of the luggage bottom support.

When the luggage caster of the present disclosure is used for maintenance and replacement, for a traditional riveting caster, an original riveting head can be removed directly by using drilling equipment (such as an electric hand drill), so that the original caster can be disassembled. Then, the installation head 231 of the vertical shaft 2 is inserted into a shaft hole of the luggage case, a tool is inserted into the anti-rotation tool hole 24 at the bottom of the vertical shaft 2, and the tool can limit the rotation of the vertical shaft 2. Since the tool can limit the rotation of the vertical shaft 2, the limiting fastener 4 is conveniently screwed with the threaded structure 231 of the installation head 231, and the caster is installed on the luggage bottom support. The vertical shaft 2 of the caster is integrated on the wheel frame 1 through the riveting flange 21 and the limiting plate 22, thereby forming an integral accessory. The use of the luggage caster of the preset disclosure is convenient, and the luggage caster has good universality. After the original caster is disassembled, a common tool can be used for direct installation of the luggage caster. The luggage caster has the advantages of simple and convenient replacement installation operation. The riveting hole 20 is directly extended to define the anti-rotation tool hole 24, which realizes the positioning and fixation of the vertical shaft 2. The luggage caster has the advantages of simple structure and convenient processing.

In an embodiment, the anti-rotation tool hole 24 is an inner hexagonal hole. The internal hexagonal hole is less affected by size, and it is easy to directly extend to define the riveting hole 20 at the bottom of the inner hexagonal hole. The internal hexagonal wrench used for the inner hexagonal hole is a common tool in daily life. Of course, the purpose of the anti-rotation tool hole 24 is to limit the vertical shaft 2 in a circumferential direction after the tool is inserted. The riveting hole 20 can be a hole of other shapes, such as a triangle or a pentagram.

To ensure that the replaced caster does not affect the normal use of the luggage case, the installation head 23 includes: a cylindrical body. The threaded structure 231 is an internal threaded hole defined in the cylindrical body. The limiting fastener 4 includes a fastening bolt 41 and a gasket 42. The fastening bolt 41 is threaded in the internal threaded hole. The installation head 23 adopts an internal threaded hole design. The internal threaded hole design effectively utilizes an axial length space of the vertical shaft 2, ensures that the fastening bolt 41 is securely locked while achieving a compact structure after locking, and a top of the vertical shaft 2 does not protrude too high. A combination of bolts and nuts can also be used, but bolts and nuts have a high protrusion of the bolt height, which occupies the internal space of the luggage case and affects its use.

In a specific embodiment, the wheel frame 1 is provided wheel body installation hubs 12 on two sides of the wheel frame 1. Each of the wheel body installation hubs 12 is hollow and cylindrical in shape. Central cylinder cavities of the wheel body installation hubs 12 are connected to each other; the wheel body installation hubs are provided with bearings, and the trolley wheels 6 are installed on the bearings respectively. An end of each of the wheel body installation hubs 12 is covered with a limiting wheel cover 6. The limiting wheel cover 6 includes a limiting cover ring 61. A center of the limiting cover ring 61 extends axially to form an installation sleeve 62. An outer circumference of the installation sleeve 62 is provided with a clamp part 621. A wall of each of the central cylinder cavities is provided with a clamp head 121 snap-fitted with the clamp part 621. The installation sleeve 62 is configured to insert into a corresponding one of the central cylinder cavities, and the installation sleeve 62 is fixed on a corresponding one of the wheel body installation hubs 12 through the clamp part 621 and the clamp head 121. The limiting cover ring 61 is in a limiting fit with the a corresponding one of bearings in an axial direction. The luggage caster is hollow with a novel structure, and the bearing is axially limited to the wheel body installation hub 12 by the limiting cover ring 61 and the snap fit between the clamp part 621 and the clamp head 121, which has the advantages of simple structure, convenient installation, and stable structure.

An axial edge of the trolley wheel 3 is provided with a wheel rim 31 that covers an outer circumferential side wall of the limiting cover ring 61. The wheel rim 31 is in a clearance fit with the outer circumferential side wall of the limiting cover ring 61.

What is claimed is:

1. A luggage caster for maintenance and replacement, comprising: a wheel frame, a vertical shaft, and trolley wheels in a clearance fit with the wheel frame; wherein the vertical shaft is configured to rotate axially within a vertical shaft hole of the wheel frame; a bottom end of the vertical shaft defines a riveting hole, and the bottom end of the vertical shaft is provided with a riveting flange surrounding the riveting hole; a top end of the vertical shaft is provided with a limiting plate that cooperates with the riveting flange to achieve an axial limitation of the vertical shaft in the vertical shaft hole; the top end of the vertical shaft is further provided with an installation head that protrudes from the limiting plate; the installation head is configured to insert into a shaft hole of a luggage bottom support; the riveting hole of the vertical shaft extends axially along the vertical shaft to define an anti-rotation tool hole, and the anti-rotation tool hole is configured to cooperate with the vertical shaft to achieve linkage locking along a circumferential direction of the vertical shaft after a tool is inserted into the anti-rotation tool hole; the installation head of the vertical shaft is provided with a threaded structure, and the threaded structure is threaded with a limiting fastener; and the limiting fastener is configured to match with the luggage bottom support axially, thereby limiting the installation head in the shaft hole of the luggage bottom support.

2. The luggage caster for maintenance and replacement as claimed in claim 1, wherein the anti-rotation tool hole is an inner hexagonal hole.

3. The luggage caster for maintenance and replacement as claimed in claim 1, wherein the installation head comprises: a cylindrical body; the threaded structure is an internal threaded hole defined in the cylindrical body; the limiting fastener comprises a fastening bolt and a gasket; and the fastening bolt is threaded in the internal threaded hole.

4. The luggage caster for maintenance and replacement as claimed in claim 1, wherein the wheel frame is provided wheel body installation hubs on two sides of the wheel frame; each of the wheel body installation hubs is hollow and cylindrical in shape; and central cylinder cavities of the wheel body installation hubs are connected to each other; the wheel body installation hubs are provided with bearings, and the trolley wheels are installed on the bearings respectively; an end of each of the wheel body installation hubs is covered with a limiting wheel cover; the limiting wheel cover comprises a limiting cover ring; a center of the limiting cover ring extends axially to form an installation sleeve; an outer circumference of the installation sleeve is provided with a clamp part; and a wall of each of the central cylinder cavities is provided with a clamp head snap-fitted with the clamp part; the installation sleeve is configured to insert into a corresponding one of the central cylinder cavities, and configured to fix on a corresponding one of the wheel body installation hubs through the clamp part and the clamp head; and the limiting cover ring is in a limiting fit with a corresponding one of the bearings in an axial direction.

5. The luggage caster for maintenance and replacement as claimed in claim 4, wherein an axial edge of each of the trolley wheels is provided with a wheel rim, and the wheel rim is configured to cover an outer circumferential side wall of the limiting cover ring; and the wheel rim is in a clearance fit with the outer circumferential side wall of the limiting cover ring.

6. A vertical shaft of a luggage caster, comprising: a shaft body; wherein a bottom end of the vertical shaft defines a riveting hole, and the bottom end of the vertical shaft is provided with a riveting flange surrounding the riveting hole; a top end of the shaft body is provided with a limiting plate that cooperates with the riveting flange to achieve an axial limitation of the vertical shaft in a vertical shaft hole; the top end of the shaft body is further provided with an installation head that protrudes from the limiting plate; the installation head is configured to insert into a shaft hole of a luggage bottom support; the riveting hole of the shaft body extends axially along the shaft body to define an anti-rotation tool hole, and the anti-rotation tool hole is configured to cooperate with the vertical shaft to achieve linkage locking along a circumferential direction of the vertical shaft after a tool is inserted into the anti-rotation tool hole; and the installation head of the vertical shaft is provided with a threaded structure.

7. The vertical shaft of the luggage caster as claimed in claim 6, wherein the anti-rotation tool hole is an inner hexagonal hole.

8. The vertical shaft of the luggage caster as claimed in claim 6, wherein the installation head comprises a cylindrical body; and the cylindrical body is provided with an internal threaded hole.

\* \* \* \* \*